US00RE34384E

United States Patent [19]

Ishiguro et al.

[11] E Patent Number: Re. 34,384

[45] Reissued Date of Patent: Sep. 21, 1993

[54] CLEANING UNIT IN ELECTROPHOTOGRAPHIC COPIER

[75] Inventors: Yasuyuki Ishiguro; Tadakazu Ogiri, both of Osaka, Japan

[73] Assignee: Mita Industrial Co., Ltd., Osaka, Japan

[21] Appl. No.: 633,391

[22] Filed: Dec. 21, 1990

Related U.S. Patent Documents

Reissue of:

[64] Patent No.: 4,806,981
Issued: Feb. 21, 1989
Appl. No.: 98,959
Filed: Sep. 21, 1987

[30] Foreign Application Priority Data

Sep. 22, 1986 [JP] Japan ..... 61-145569

[51] Int. Cl.[5] ..... G03G 21/00

[52] U.S. Cl. ..... 355/298; 355/299; 118/652; 15/256.51

[58] Field of Search ..... 355/298, 299, 296, 297; 118/652; 15/256.5, 256.51, 256.52

[56] References Cited

U.S. PATENT DOCUMENTS

| | | | |
|---|---|---|---|
| 3,848,993 | 11/1974 | Hasiotis . | |
| 4,218,132 | 8/1980 | Iwai et al. . | |
| 4,297,026 | 10/1981 | Honda et al. . | |
| 4,334,766 | 6/1982 | Sugiyama et al. | 15/256.52 |
| 4,357,098 | 11/1982 | Endo . | |
| 4,403,852 | 9/1983 | Hirabayashi et al. . | |
| 4,417,365 | 11/1983 | Murasaki . | |
| 4,451,139 | 5/1984 | Yanagawa et al. | 15/256.52 |
| 4,530,594 | 7/1985 | Adachi . | |
| 4,561,766 | 12/1985 | Fox . | |

FOREIGN PATENT DOCUMENTS

| | | | |
|---|---|---|---|
| 2166851 | 7/1976 | Fed. Rep. of Germany . | |
| 57-133470 | 8/1982 | Japan . | |
| 58-159570 | 9/1983 | Japan . | |
| 58-203480 | 11/1983 | Japan . | |
| 59-49576 | 3/1984 | Japan . | |
| 59-79276 | 5/1984 | Japan . | |
| 59-127081 | 7/1984 | Japan . | |
| 60-33583 | 2/1985 | Japan | 355/299 |
| 60-95581 | 5/1985 | Japan | 355/299 |
| 60-113278 | 6/1985 | Japan | 355/299 |
| 60-170880 | 9/1985 | Japan . | |
| 60-186887 | 9/1985 | Japan | 355/299 |
| 60-110186 | 5/1986 | Japan | 355/299 |
| 61-133971 | 6/1986 | Japan . | |

*Primary Examiner*—R. L. Moses
*Attorney, Agent, or Firm*—Finnegan, Henderson, Farabow, Garrett, and Dunner

[57] ABSTRACT

A cleaning unit for an electrophotographic copier is provided to remove toner and developing material from a photo-sensitive material from which a developed image has been transferred and includes a housing having an opening facing the photo-sensitive material. A main blade member is provided in the housing of the cleaning unit and has an upper portion which abuts against the photo-sensitive material through an opening of the housing to scrape the toner and developing materials off the photo-sensitive material. The cleaning unit further includes a receiving blade covering the lower portion of the opening, and having an upper end portion abutted against the photo-sensitive material to allow the toner and developing material scraped off by the main blade to fall into the opening and a film-shaped reinforcing member bonded to the surface of the receiving blade facing the inside of the housing to prevent deformation of the receiving blade.

6 Claims, 5 Drawing Sheets

CLEANING UNIT IN ELECTROPHOTOGRAPHIC COPIER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an electrophotographic copier in which an electrostatic latent image, formed on a photo-sensitive material, is developed with toner, and the developed image is transferred onto a transferring sheet to obtain a copied image. And more particularly, this invention relates to a cleaning unit in the copier which is adapted to remove toner and developing materials from the photo-sensitive material from which a developed image has been transferred.

2. Description of the Related Art

In general, in an electrophotographic copier, a predetermined electrostatic latent image is formed on a photo-sensitive material provided on a rotating photo-sensitive drum. The latent image is then developed with toner, and the developed image is transferred onto a transferring sheet to obtain a copied image. In general, after the developed image has been transferred onto the transferring sheet, the toner and developing materials remain on the photo-sensitive material necessitating removal from the photo-sensitive material with a cleaning unit.

A conventional cleaning unit, such as that shown in FIGS. 6, 7, and 8, has a housing 51 with an opening 51*a*. The opening 51*a* faces a photo-sensitive material 10*a* provided on the outer cylindrical wall of a photo-sensitive drum 10. A cleaning member, namely, a main blade 52 is disposed in the upper part of the housing 51 in such a manner as to touch the surface of the photo-sensitive material 10*a* in order to scrape the remaining toner and developing material off the surface of the photo-sensitive material 10*a*. A receiving blade 53 of thermo-plastic polyurethane rubber or similar material is provided in such a manner as to cover the lower portion of the opening 51*a* of the housing 51. The upper edge of the receiving blade 53 abuts against the photo-sensitive material 10*a* so that all of the toner and developing materials scraped off with the main blade 52 fall positively into the housing 51 without scattering therefrom.

If the electrophotographic copier is shipped out of the factory with the upper edge of the receiving blade 53 abutted against the surface of the photo-sensitive material 10*a*, then the surface of the photo-sensitive material 10*a* can deteriorate during transportation. The photo-sensitive material 10*a* is especially sensitive to deterioration when the copier is transported over a long distance with the environmental conditions changing greatly.

In order to overcome this difficulty, a method has been employed in which the electrophotographic copier is shipped out of the factory with the receiving blade 53 held away from the photo-sensitive material 10*a*. For instance, as shown in FIG. 9, the receiving blade 53 is coupled to a support 54 which can be detachably secured to the housing 51 of the cleaning unit, and when the copier is shipped out of the factory, the support 54 is disconnected from the housing 51 (as indicated by the two-dot chain line in FIG. 7). Accordingly, during the transportation of the copier, the receiving blade 53 does not contact the photo-sensitive material 10*a* and the photo-sensitive material 10*a* is less likely to be deteriorated.

This method is nevertheless disadvantageous because the receiving blade 53 is liable to be deformed. After transportation of the copier, the support 54 is coupled to the housing 51 so that the receiving blade 53 abuts the photo-sensitive 10*a*. However, the end portion of the receiving blade 53, being abutted against the photo-sensitive material 10*a*, is bent inwardly of the housing 51, thus forming a gap between the blade and the photo-sensitive material 10*a* as shown in FIG. 10. If a gap is formed, then when the toner is scrapped off with the main blade, it will drop through the gap, thus smudging the transferring sheet conveying path or some other part of the copier which extends below the housing 51.

SUMMARY OF THE INVENTION

An object of this invention is to eliminate the above-described difficulties accompanying a conventional cleaning unit in an electrophotographic copier.

More specifically, an object of the invention is to provide a cleaning unit for an electrophotographic copier in which the receiving blade is prevented from being deformed when abutted against the photo-sensitive material.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the cleaning unit for an electrophotographic copier adapted to remove toner and developing material from a photo-sensitive drum having photo-sensitive material disposed thereon from which a developed image has been transferred, of the invention comprises: a housing having an opening facing the photo-sensitive material; a cleaning member provided in the housing, the cleaning member having an end portion which abuts against the photo-sensitive material through the opening of the housing to scrape the toner and developing materials off the photo-sensitive material; a receiving blade covering the lower portion of the opening and having an upper end portion abutted against the photo-sensitive material to allow the toner and developing material scraped off by the cleaning member to fall into the opening; and a film-shaped reinforcing member bonded to the surface of the receiving blade facing the inside of the housing.

The accompanying drawings, which are incorporated in and constitute a part of this specification, illustrate one embodiment of the invention and, together with the description, serve to explain the principles of the invention.

DESCRIPTION OF THE PREFERRED EMBODIMENT

Figure 1:
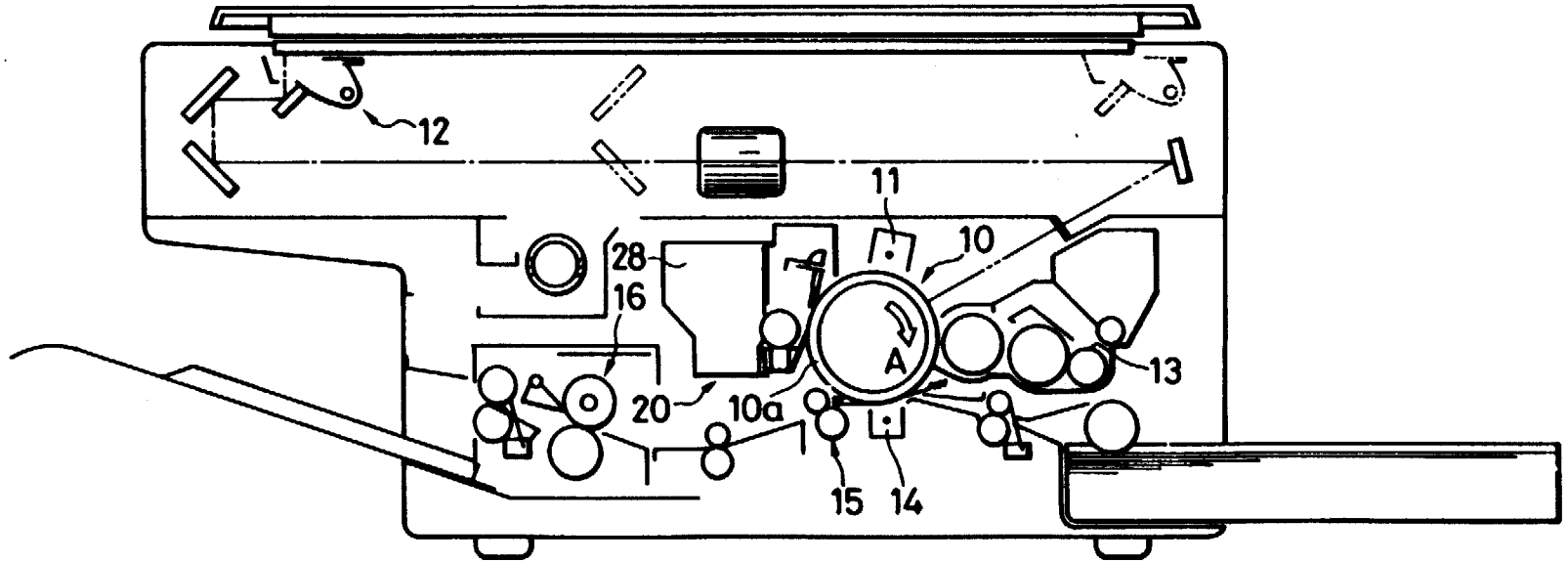
FIG. 1 is cross-sectional diagram illustrating the electrophotographic copier with a cleaning unit constructed in accordance with the present invention.

Reference will now be made in detail to the present preferred embodiment of the invention, an example of which is illustrated in the accompanying drawings in which like reference characters refer to corresponding elements.

A cleaning unit according to the invention is used, for example, in an electrophotographic copier such as shown in FIG. 1. The copier has a photosensitive drum 10 which is turned in the direction of the arrow A, the axis of rotation being located at the center of the drum 10. A photo-sensitive material 10*a* is provided on the outer cylindrical surface of the photo-sensitive drum 10. While the drum 10 is rotated in the direction of the arrow A, the photo-sensitive material 10*a* is uniformly charged by a charging unit 11. Then, a predetermined image is projected onto the photo-sensitive material 10*a* by an exposing unit 12, so that a latent image is formed in the photo-sensitive material 10*a*. The latent image is developed with toner by a developing unit 13. Then, the developed image is transferred onto a transferring sheet by a transferring unit 14. The transferring sheet is separated from the photo-sensitive material 10*a* by a separating unit 15. After the developed image is set by a fixing unit 16, the sheet is discharged out of the copier. The toner and other developing materials are then removed from the photo-sensitive material 10 by the cleaning unit 20 according to the present invention.

Figure 2:
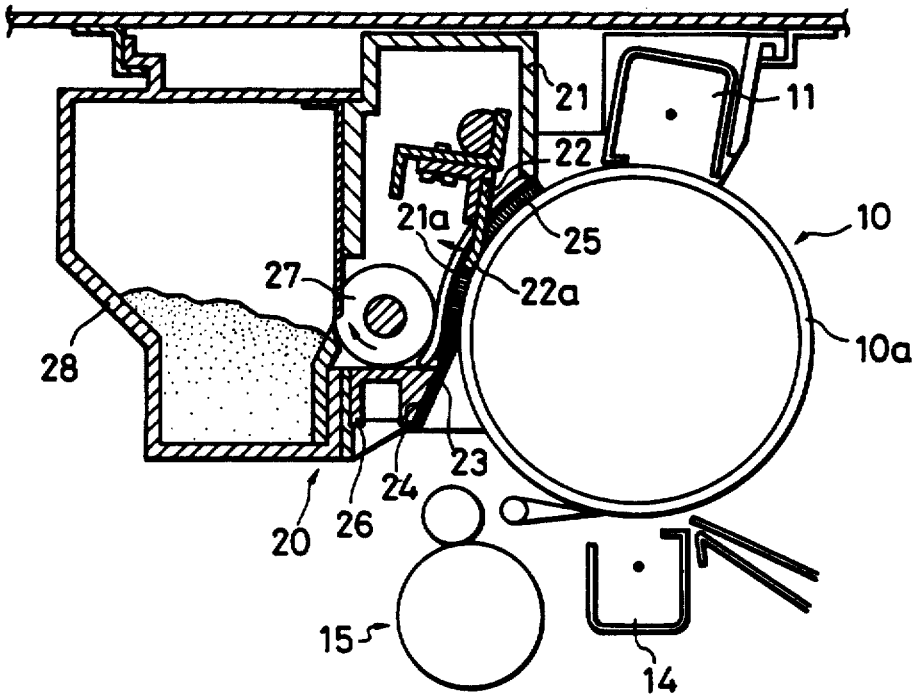
FIG. 2 is an enlarged sectional view of the cleaning unit shown in FIG. 1.

As shown in FIG. 2, the cleaning unit 20 of the present invention includes a housing 21 with an opening 21*a*; a cleaning member, namely, a main blade 22 for scrapping the remaining toner and developing materials off the surface of the photo-sensitive material 10*a*; a receiving blade 23 for causing the toner and developing materials that are scraped off by receiving blade 23 to drop into the housing 21; and a reinforcing member 24 attached to the receiving blade 23.

An opening 21*a* of the housing 21 is located between the separating unit 15 and the charging unit 11 facing the photo-sensitive material 10*a* of the photo-sensitive drum 10.

The main blade 22 is pivotally supported in the upper portion of the housing 21. More specifically, when the main blade 22 is pivoted in one direction, its end portion 22*a* protrudes outside the housing through the opening 21 to contact the surface of the photo-sensitive material 10*a*; and when the main blade 22 is pivoted in the other direction, the end portion 22*a* is moved away from the photo-sensitive material 10*a*.

Figure 3:
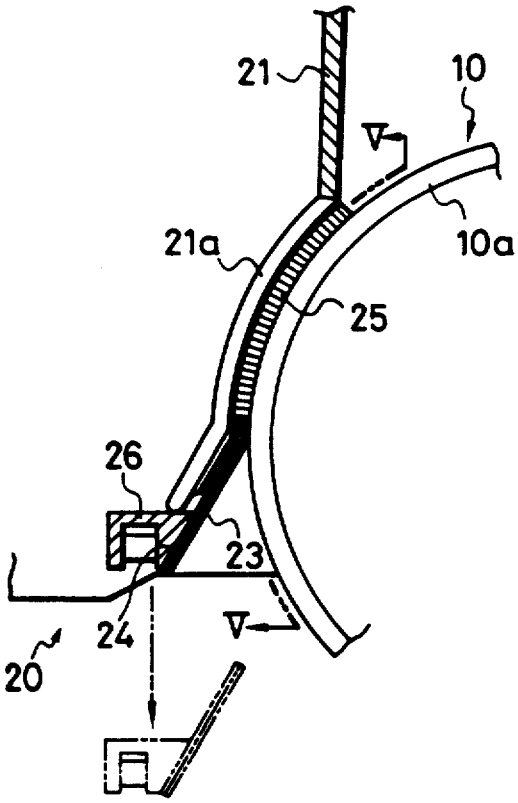
FIG. 3 is an enlarged diagram illustrating the components of the cleaning of FIG. 2.

The receiving blade 23 is made of thermo-plastic polyurethane rubber or similar material. The receiving blade 23 covers the lower portion of the opening 21*a* as illustrated more clearly in FIG. 3. The upper end portion of the receiving blade 23 abuts against the photo-sensitive material 10*a* substantially over the entire axial length.

Figure 4:
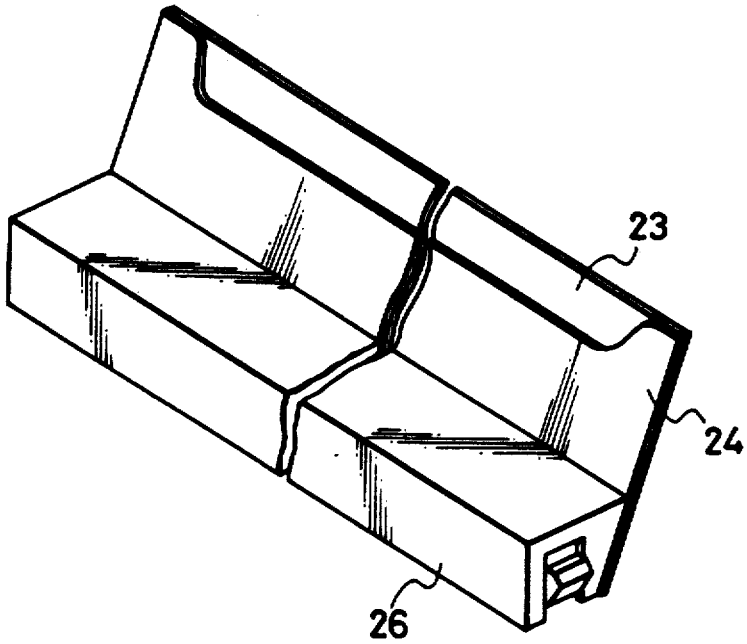
FIG. 4 is a perspective view illustrating the components of the cleaning unit of FIG. 2.
Figure 5:
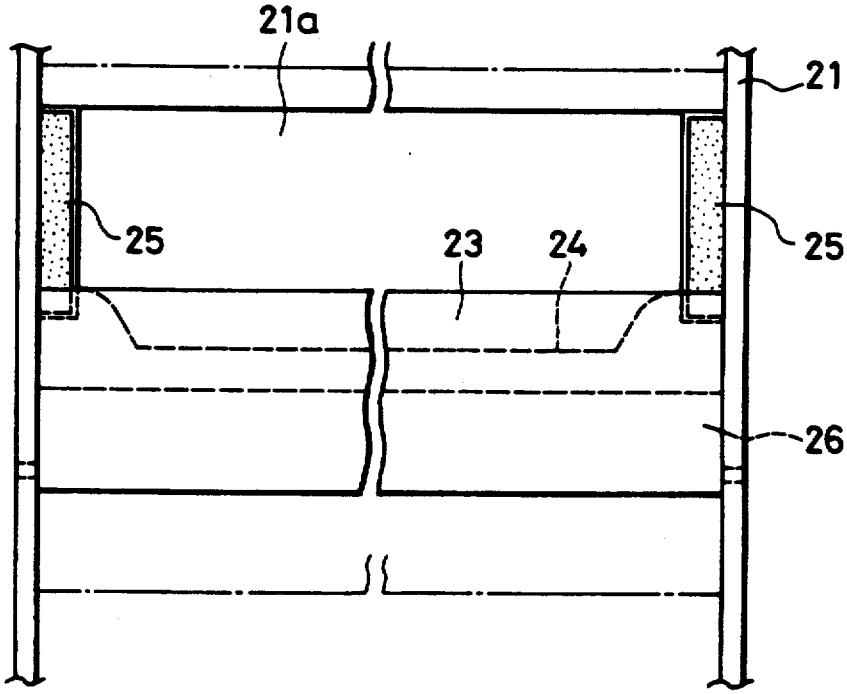
FIG. 5 is a view taken in the direction of arrow V—V from FIG. 3.
Figure 6:
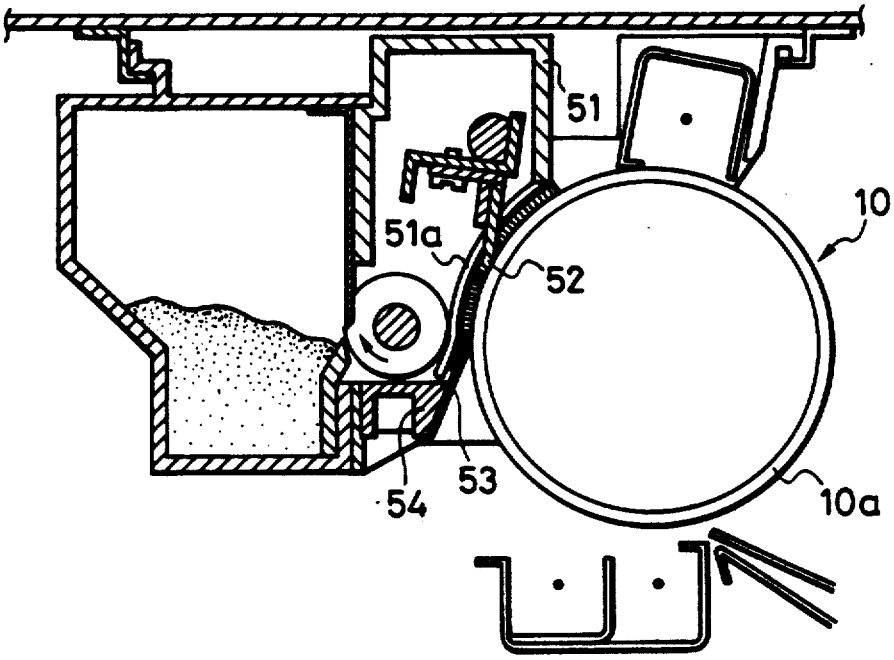
FIG. 6 is a cross-sectional diagram illustrating a conventional cleaning unit.
Figure 7:
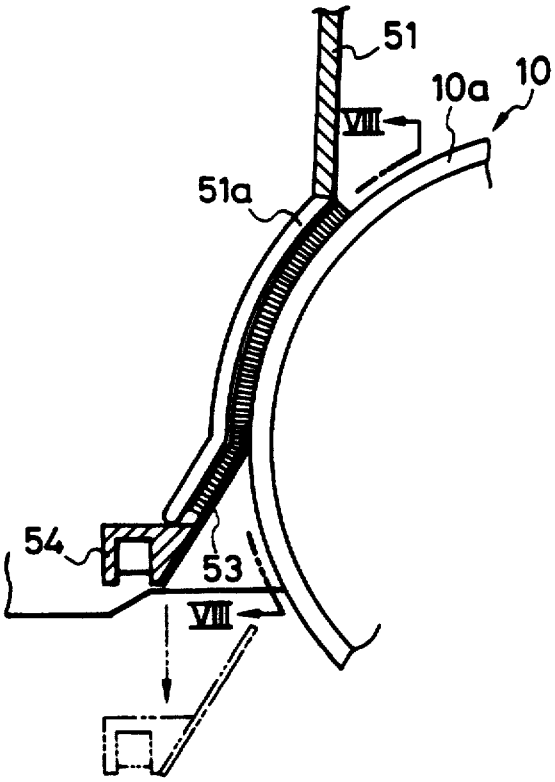
FIG. 7 is an enlarged diagram illustrating the components of the cleaning shown in FIG. 6.
Figure 8:
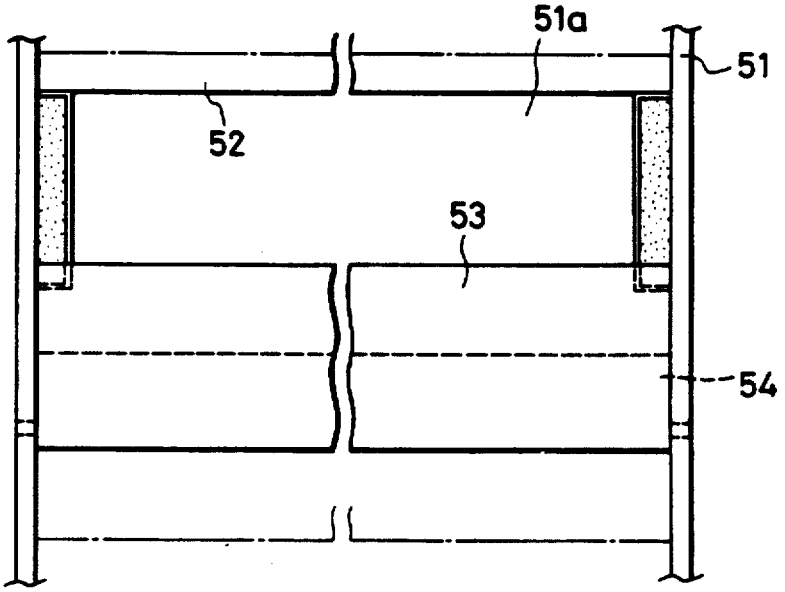
FIG. 8 is a view taken in the direction of arrow VIII—VIII in FIG. 7.
Figure 9:
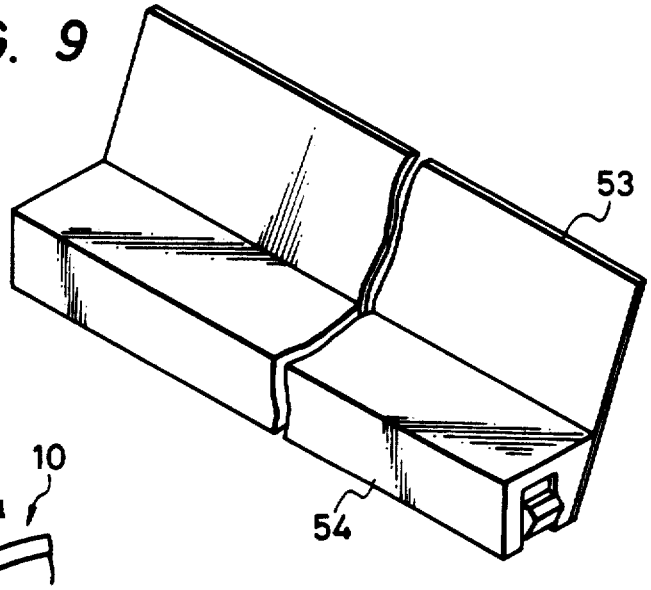
FIG. 9 is a perspective view illustrating the components of the conventional cleaning unit of FIG. 6.
Figure 10:
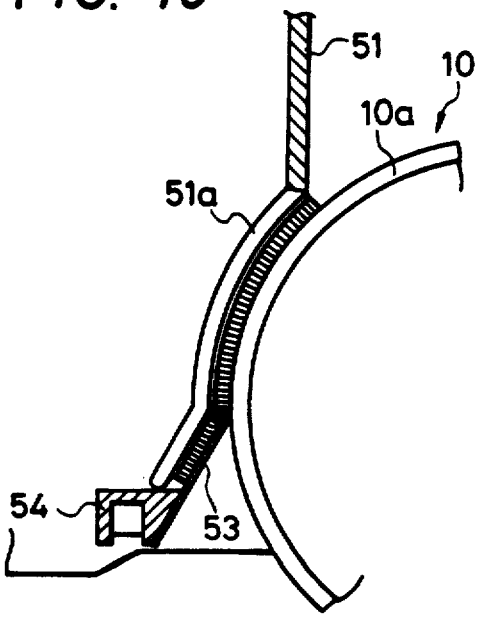
FIG. 10 is a sectional view illustrating a receiving blade in the conventional cleaning unit of FIG. 6.

As shown in FIGS. 4 and 5, a reinforcing member 24, of polyester film or similar material, is bonded to the rear surface of the receiving blade 23 facing the inside of the housing 21. The reinforcing member 24 has a cut in its upper end portion facing an image-forming region which is defined on the photo-sensitive material 10*a* by both end regions in the axial direction. The cut of reinforcing member 24 is arcuate at its corners. Therefore, it is not necessary to bond reinforcing member 24 to the rear surface of the receiving blade 23 which abuts against the image-forming region of the photo-sensitive material 10*a*. Therefore, the receiving blade 23 is not pushed against the image-forming region of the photo-sensitive material 10*a* by the reinforcing member 24.

Seal members 25 are disposed inside the housing 21 facing the two end portions, or the two non-image-forming regions, of the photo-sensitive material 10*a*. Each of the seal members 25 is formed by sticking soft fibers on the housing 21. The upper and middle portion of each of the seal members 25 abut against the photo-sensitive material 10*a* through the opening 21*a*, and the lower portion of each seal members 25 abuts against the reinforcing member 24. Accordingly, the seal members 25 and the reinforcing member 24 push the receiving blade 23 against the non-image-forming regions of the photo-sensitive material 10*a* in the axial direction of the photo-sensitive material 10*a*. Therefore, the toner and other developing materials which are scraped off with the main blade 22 will never be scattered outside of the housing.

As shown in FIG. 2, a conveying roller 27 is arranged above a support 26 which is engaged with the housing 21 at the lower end. Therefore, the toner and other developing materials that drop into the housing 21 are conveyed by the conveying roller 27 into a used toner recovering unit 28 which is disposed on the other side of the housing 21 opposite to the side where the photo-sensitive drum 10 is arranged.

Before the electrophotographic copier with the cleaning unit of the present invention is shipped out of the factory, a support 26 is removed from the housing 21 so that the receiving blade 23 is held away from the photo-sensitive material 10*a*. Therefore, before operation of the copier, the support 26 must be engaged with the housing 21 so that the upper end portion of the receiving blade 23 abuts against the photo-sensitive material 10*a* of the photo-sensitive drum 10.

After the support 26 has been coupled to the housing 21, as described above, the copier is operated in the conventional electrophotographing method. That is, a toner image is formed on the photo-sensitive material 10*a*, and the toner image thus formed is transferred onto a transferring sheet, providing a copied image. As the drum 10 rotates, the part of the photo-sensitive material 10*a* from which the toner image has been transferred is moved to the cleaning unit 20 according to the present invention.

In the cleaning unit 20, the blade 21 abuts against a rotating photo-sensitive material 10*a* and scrapes the remaining toner and other developing materials off the photo-sensitive material 10*a*. The toner and other developing materials that are scraped off are allowed to fall down the receiving blade 23, abutted against the photo-sensitive material 10*a*, into the housing 21. The scraped off material is then conveyed by the conveying roller 27 into the used toner recovering unit 28.

In the cleaning unit of the present invention, the reinforcing member 24 is bonded to the receiving blade 23 in the manner described above. Therefore, the cleaning unit overcomes the problem that occurs when the receiving blade abuts against the photo-sensitive material, i.e., deformation of the receiving blade causing a gap to be formed between the receiving blade and the photo-sensitive material. Thus, the toner which is scraped off the photo-sensitive material will not scatter upon dropping through the gap onto the transferring sheet conveying path.

It will apparent to those skilled in the art that various modifications and variations can be made in the cleaning unit of the present invention without departing from the scope or spirit of the invention. Thus, it is intended that the present invention cover the modifications and variations of this invention provided they come within the scope of the appended claims and their equivalents.

What is claimed is:

1. A cleaning unit in an electrophotographic copier adapted to remove toner and [developer] *developing* material from a photo-sensitive drum having photo-sensitive material disposed thereon from which a developed image has been transfererd, said cleaning unit comprising:

a housing having an opening facing said photo-sensitive material;

a cleaning member provided in said housing, said cleaning member having an end portion which abuts against said photo-sensitive material through said opening of said housing to scrape the toner and developing material off said photo-sensitive material;

a receiving blade *detachably coupled to said housing,* covering the lower portion of said opening and having an upper end portion abutted against said photo-sensitive material to allow said toner and developing materials scraped off by said cleaning member to fall into the opening; and a [film-shaped] reinforcing member [bonded] *attached* to the surface of said receiving blade facing the inside of said housing, [an upper end portion of said reinforcing member abutting against an image-forming region of said photo-sensitive material and being separated from said receiving blade,] said reinforcing member being arranged on a rear surface of said receiving blade at a portion of said receiving blade where said receiving blade abuts against a non-image-forming region of said photo-sensitive material.

[2. The cleaning unit as claimed in claim 1, wherein said receiving blade to which said reinforcing member has been bonded is detachably coupled to said housing.]

3. The cleaning unit as claimed in claim 1, wherein said cleaning member is pivotally supported in said housing such that when said cleaning member is pivoted in one direction, said end portion protrudes outside said housing through said opening to contact the surface of said photo-sensitive material, and when said cleaning member is pivoted in another direction, said end portion is moved away from said photo-sensitive material.

4. The cleaning unit as claimed in claim 1, further including a plurality of seal means for pushing said receiving blade against an end portion of said photo-sensitive material in an axial direction.

5. The cleaning unit as claimed in claim 1, further including a used toner recovering unit means, disposed on said housing opposite to said photo-sensitive drum conveying means for carrying the scraped off toner and developing material to said used toner recovering unit means.

6. The cleaning unit of claim 1 wherein said reinforcing member includes a cut in said upper end portion facing a portion of said receiving blade where said receiving blade abuts against said image-forming region of said photo-sensitive material.

7. The cleaning unit of claim 6 wherein said cut in said reinforcing member is arcuate at corners of said reinforcing member.

* * * * *

UNITED STATES PATENT AND TRADEMARK OFFICE

CERTIFICATE OF CORRECTION

PATENT NO. : Re. 34, 384
DATED : September 21, 1993
INVENTOR(S) : Yasuyuki Ishiguro, et. al.

It is certified that error appears in the above-indentified patent and that said Letters Patent is hereby corrected as shown below:

Claim 1, column 5, line 30, change "transfered" to --transferred--.

Claim 1, column 5, line 40, change "rial;" to --rials;--.

Claim 1, column 6, line 7, change "image-forming" to --image forming--.

Claim 1, column 6, line 7, change "photo-sensitive" to --photosensitive--.

Claim 1, column 6, line 10, change "at" to --and--.

Signed and Sealed this

Twentieth Day of September, 1994

Bruce Lehman

*Attest:*

BRUCE LEHMAN

*Attesting Officer*

*Commissioner of Patents and Trademarks*